United States Patent [19]

Jolley et al.

[11] Patent Number: 4,681,361
[45] Date of Patent: Jul. 21, 1987

[54] STORAGE POD

[76] Inventors: Sue H. Jolley; William H. Jolley, both of 106 Prospect Dr., Water Valley, Miss. 38965

[21] Appl. No.: 886,422

[22] Filed: Jul. 17, 1986

[51] Int. Cl.$^4$ .............................................. B60R 5/00
[52] U.S. Cl. .................................. 296/37.7; 296/37.8; 296/26
[58] Field of Search ....................... 296/37.7, 37.8, 26, 296/27, 166, 160

[56] References Cited

U.S. PATENT DOCUMENTS

| | | | |
|---|---|---|---|
| 3,021,171 | 2/1962 | Beranyi | 296/37.7 |
| 3,719,383 | 3/1973 | Ferro | 296/166 |
| 3,770,314 | 11/1973 | Borskey | 296/26 |

FOREIGN PATENT DOCUMENTS 1275368  8/1968  Fed. Rep. of Germany ..... 296/37.7

Primary Examiner—Robert R. Song
Attorney, Agent, or Firm—Walker & McKenzie

[57] ABSTRACT

An externally mounted storage compartment for a vehicle adapted to allow access into the interior of the storage compartment from the interior of the vehicle. Access openings are provided through the body of the storage compartment and the body of the vehicle. The storage compartment is then attached to the exterior of the vehicle with the access openings substantially aligned with one another to allow access from the interior of the vehicle into the interior of the storage compartment.

9 Claims, 5 Drawing Figures

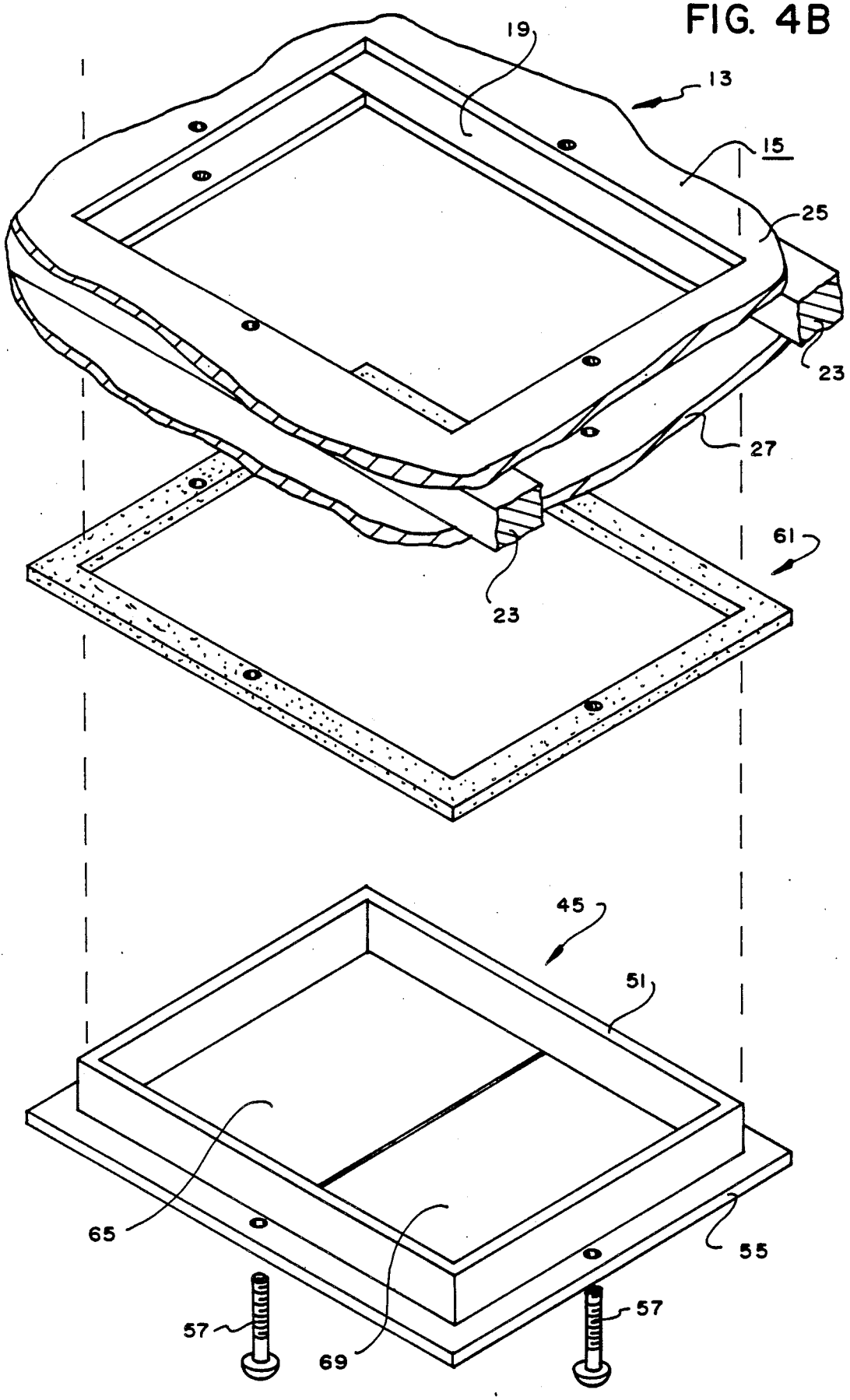

4,681,361

STORAGE POD

BACKGROUND OF THE INVENTION

1. Field of the Invention: The present invention relates, in general, to means for increasing the storage space of vehicles and the like.

2. Description of the Related Art: A preliminary patentability search in Class 296, subclasses 164, 165, 166, 168, 37.7, and 37.8 and in Class 280, subclasses 403 and 423 disclosed the following patents: Plant, U.S. Pat. No. 3,637,251; Hathaway, U.S. Pat. No. 3,729,224; Schwellenbach, U.S. Pat. No. 3,843,158; and Chapman, U.S. Pat. No. 3,937,516. None of the above patents disclose or suggest the present invention.

Most recreational vehicles (motor homes, camping trailers, vans, etc.) have a limited amount of storage space. This is evident in the active secondary market of external storage compartments known as "storage pods" which are typically fiberglass enclosures with capacities from 10 to 25 cubic feet designed to be mounted on the roof of the vehicle. An obvious disadvantage of such a device is the necessity of climbing to the top of the vehicle to load or unload the pod. Means have been developed to allow such a pod to be mounted to the rear wall of the vehicle to overcome the problem of climbing to the top of the vehicle to load or unload the pod. None of the above prior art disclose or suggest the present invention.

SUMMARY OF THE INVENTION

The present invention is directed toward providing an improved external storage compartment for vehicles. The concept of the present invention is to allow access to the interior of an external storage compartment from the interior of a vehicle or the like.

The storage pod of the present invention is for use with a vehicle having a body with a substantially hollow interior and having an access opening through the body into the interior, the pod comprising a storage compartment having a body with a substantially hollow interior and having an access opening through the body thereof into the interior thereof; and access/attachment means attaching the body of the storage compartment to the body of the vehicle with the access opening through the body of the storage compartment substantially aligned with the access opening through the body of the vehicle for allowing access into the interior of the body of the storage compartment from the interior of the body of the vehicle.

DESCRIPTION OF THE PREFERRED EMBODIMENT

Figure 1:
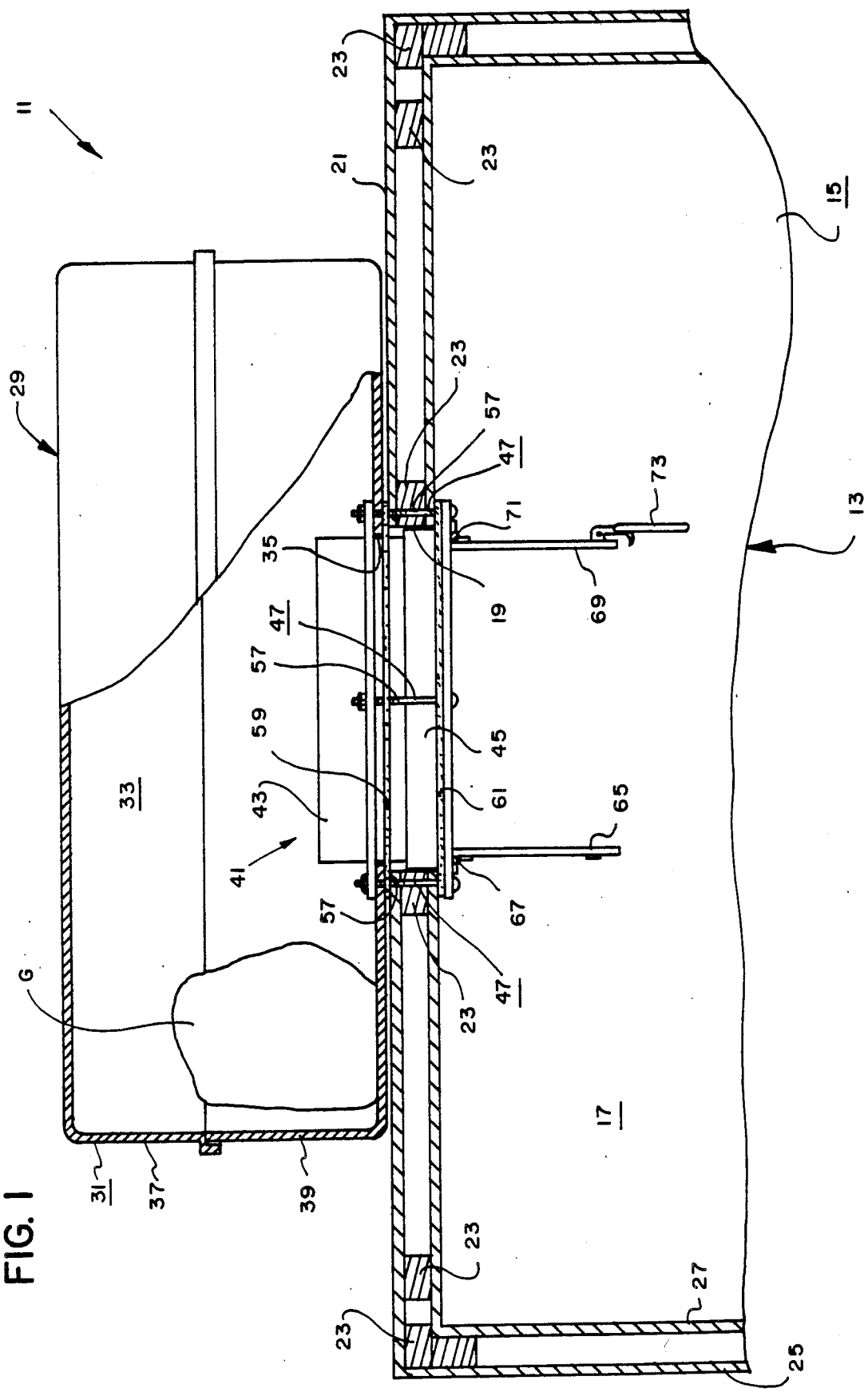
FIG. 1 is a front elevational view of the storage pod of the present invention shown attached to the roof of a recreational vehicle, or the like, with portions thereof broken away to show internal structure.

The storage pod 11 of the present invention is for use with a vehicle 13 having a body 15 with a substantially hollow interior 17 and having an access opening 19 through the body 15 into the interior 17 (see FIG. 1). The vehicle 13 may be a typical recreational vehicle such as a motor home, trailer, van or the like. The access opening 19 preferably extends through the roof 21 of the vehicle 13 and may consist of a pre-existing opening through the body 15 of the vehicle (e.g., a pre-existing vent aperture or the like) or may consist of an opening especially provided through the body 15 for the pod 11. The access opening 19 is preferably provided between two adjacent, typical structural members 23 of the body 15 onto which the outer skin 25 and inner skin 27 of the body 15 are attached as is apparent to persons of ordinary skill in the art.

The pod 11 of the present invention includes a storage compartment 29 for holding goods G to be temporarily stored (see FIG. 1). The storage compartment 29 has a body 31 with a substantially hollow interior 33 and has an access opening 35 through the floor or wall of the body 31 thereof into the interior 33 thereof. Other than the access opening 35, the storage compartment 29 may be of any typical construction, shape and size well known to those of ordinary skill in the art. Thus, the body 31 may be molded or otherwise constructed out of fiberglass, plastic or the like. The body 31 preferably consists of a first body member 37 and a second body member 39 hingeably or otherwise movably attached to one another to allow external access into the interior 33 in a manner as will be apparent to those of ordinary skill in the art. The body 31 may be constructed with the access opening 35 provided therein or the access opening 35 may be cut to otherwise formed in the body 31 after the body 31 has been constructed in any typical manner.

Figure 3:
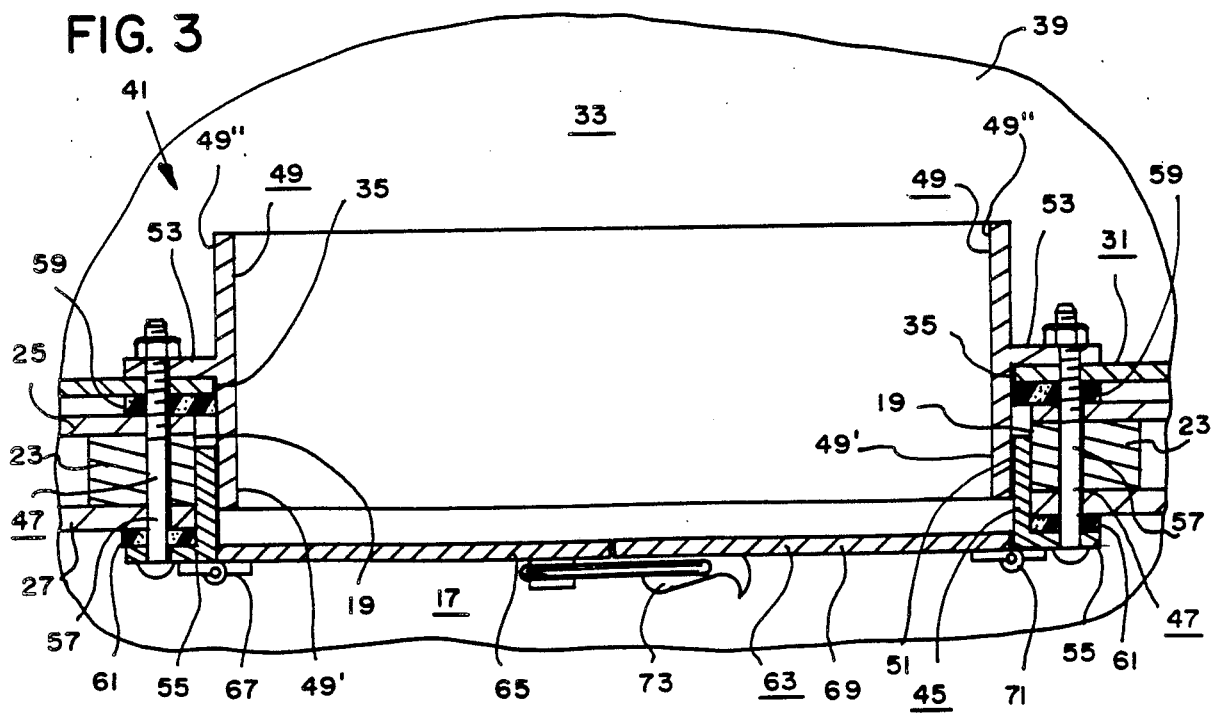
FIG. 3 is a sectional view as taken on line III—III of FIG. 2.
Figure 4:
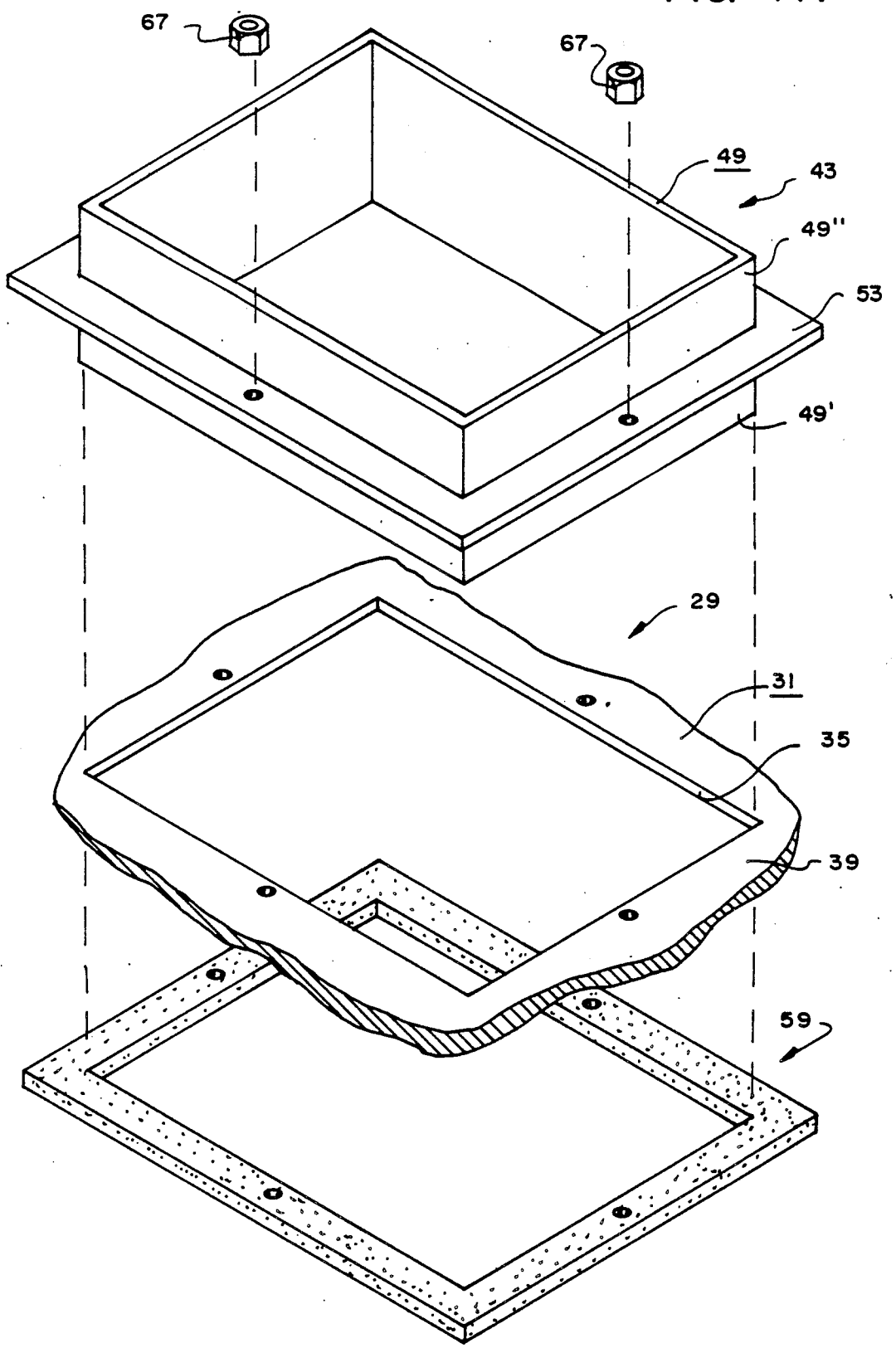
FIGS. 4A and 4B are exploded perspective views of certain portions of the storage pod and associated structure of the present invention.

The pod 11 includes access/attachment means 41 for attaching the body 31 of the storage compartment 29 to the body 15 of the vehicle 13 with the access opening 35 through the body 31 of the storage compartment 29 substantially aligned with the access opening 19 through the body 15 of the vehicle 13 for allowing access to the interior 33 of the storage compartment 29 from the interior 17 of the vehicle 13 (see FIGS. 1 and 3). The access/attachment means 41 preferably includes a first access/attachment member 43 located within the interior 33 of the body 31 of the storage compartment 29, preferably includes a second access/attachment member 45 located within the interior 17 of the body 15 of the vehicle 13, and preferably includes securing means 47 for securing the first and second access/attachment members 43, 45 to one another in such a manner so as to substantially align the access opening 35 through the body 31 of the storage compartment 29 with the access opening 19 through the body 15 of the vehicle 13. The first access/attachment member 43 preferably includes a sleeve member 49 for extending into the access opening 35 through the body 31 of the storage compartment 29. The second access/attachment member 45 preferably includes a sleeve member 51 for extending into the access opening 19 through the body 15 of the vehicle 13. The sleeve members 49, 51 of the first and second access/attachment members 43, 45 are preferably adapted to overlap at least a portion of one another. the first access/attachment member 43 preferably includes a flange member 53 attached to and extending outwardly of the sleeve member 49 thereof for engaging the body 31 of the storage compartment 29 adjacent the access opening 35 therethrough. The second access/attachment member 45 preferably includes a flange member 55 attached to and extending outwardly of the sleeve member 49 thereof for engaging the body 15 of the vehicle 13 adjacent the access opening 19 therethrough. The first and second acces/attachment members 43, 45 may be constructed in any manner now apparent to those skilled in the art such as by being molded or cast out of metal or rigid plastic, etc. The securing means 47 may include a plurality of typical bolt means 57 for securing the flange member 53, 55 of the first and second access/attachment members 43, 45 to one another with portions of the body 31 of the storage compartment 29 adjacent the access opening 35 therethrough and portions of the body 15 of the vehicle 13 adjacent the access opening 19 therethrough sandwiched therebetween. One or more of the bolt means 57 preferably extend through a structural member 23 to securely anchor the storage compartment 29 to the vehicle 13. Other typical means are preferably used in addition to the first and second access/attachment members 43, 45 to securely attach the storage compartment 29 to the vehicle 13 as will be apparent to those of ordinary skill in the art.

A first seal member 59 is preferably provided for placement between flange member 53 of the first access-/attachment member 43 and the body 15 of the vehicle 13 (see FIG. 3). A second seal member 61 is preferably provided for placement between the flange member 55 of the second access/attachment member 45 and the body 15 of the vehicle 13 (see FIG. 3). The seal members 59, 61 may consist of typical foam rubber gaskets or the like well known to those of ordinary skill in the art. The first seal member 59 is preferably positioned between the body 31 of the storage compartment 29 and the body 15 of the vehicle 13 (see FIG. 1) to provide a weather-tight seal therebetween about the access opening 19.

The flange member 53 of the first access/attachment means 41 is preferably positioned in intermediate the opposite ends of the sleeve member 49 thereof to divide the sleeve member 49 into a first end 49' and a second end 49" for allowing the first end 49' of the sleeve member 49 to extend into the access opening 35 through the body 31 of the storage compartment 29 while allowing the second end 49" of the sleeve member 49 to extend into the interior 33 of the storage compartment 29 for defining a lip around the access opening 35 through the body 31 of the storage compartment 29. The lip formed around the access opening 35 by the second end 49" of the sleeve member will provide means to prevent inadvertent sliding of goods G stored within the storage compartment 29 into the access opening 35. Various additional partitions, or the like (not shown) may be provided within the interior 33 of the storage compartment 29 to facilitate the storage of the goods G therein.

The first end 49' of the sleeve member 49 is preferably adapted to extend through the access opening 35 and into the access opening 19. The first end 49' of the sleeve member 49 will thus overlap one end of the sleeve member 51 as clearly shown in FIG. 3. The overlapping portion of the sleeve members 49, 51 will thus completely cover the access openings 19, 35 and seal members 59, 61 while being adjustable to accommodate vehicles 13 having bodies 15 of differing thicknesses, etc.

Figure 2:
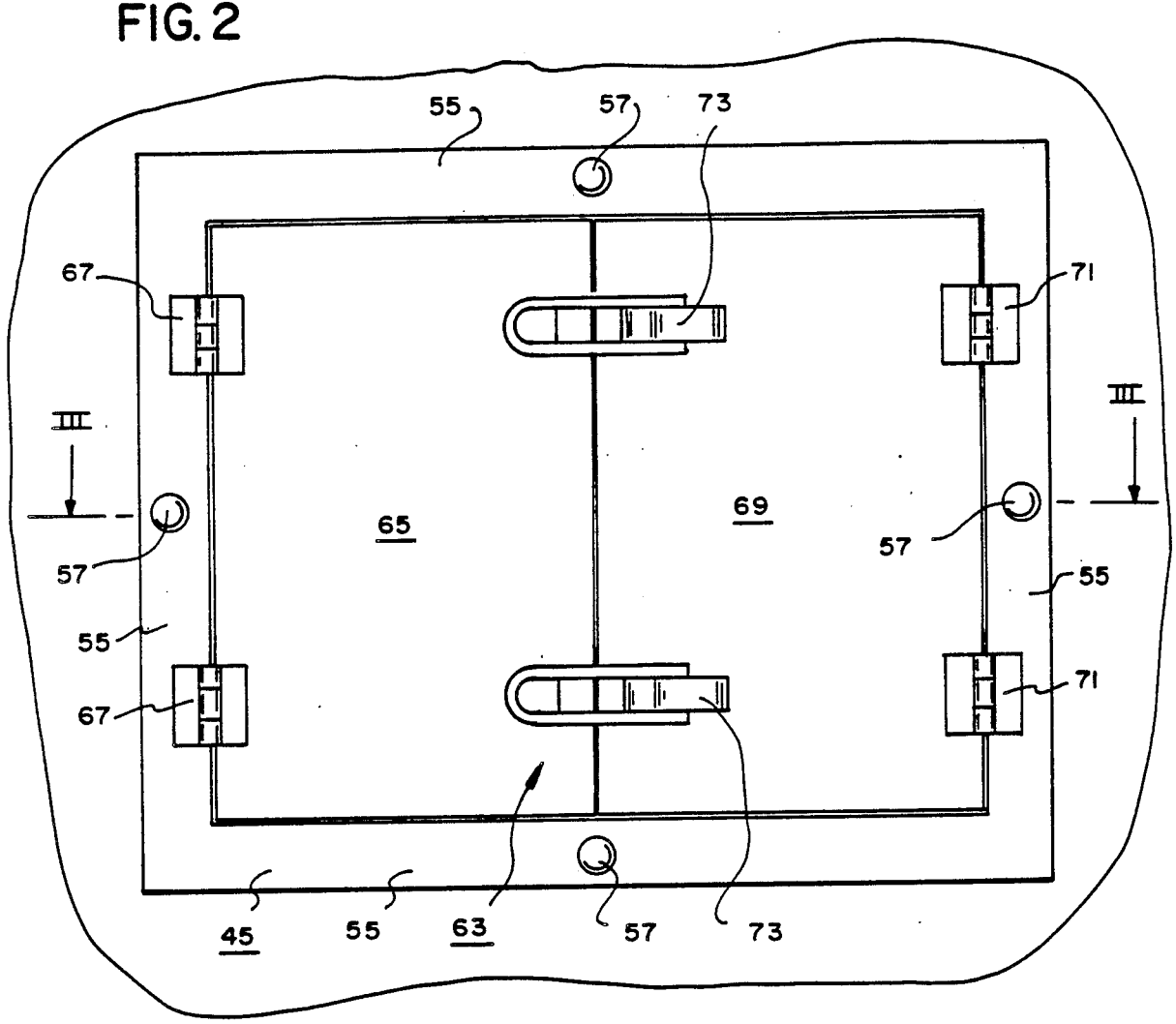
FIG. 2 is an enlarged bottom plan view of a portion of FIG. 1 with certain portions thereof in a moved position.

A door means 63 is preferably provided for selectively closing the access opening 35 through the body 31 of the storage compartment 29 (see, in general, FIG. 3). The door means 63 may be of any typical construction. Thus, for example, the door means 63 may include a first door member 65 hingeably attached to one side of the second access/attachment member 45 by typical hinge means 67 or the like and a second door member 69 hingeably attached to another side of the second access-/attachment means by typical hinge means 71 or the like with the first and second door members 65, 69 movable between a closed position as shown in FIGS. 2 and 3 and an open position as shown in FIG. 1. A typical lock means 73 or the like is preferably provided for locking the first and second door members 65, 69 in the closed position.

To use the pod 11 once the storage compartment 29 has been attached to the body 15 of the vehicle 13 as heretofore described, a person within the interior 17 of the body 15 of the vehicle 13 need only open the door members 65, 69 by way of the lock means 73 whereby access into the interior 33 of the storage compartment 29 can be gained from the interior 17 of the vehicle 13.

Although the invention has been described and illustrated with respect to a preferred embodiment and a preferred use therefor, it is not to be so limited since changes and modifications can be made therein which are within the full intended scope of the invention.

We claim:

1. A storage pod for a vehicle said vehicle having a body with a substantially hollow interior and having an access opening through said body into said interior, said pod comprising:
   (a) a storage compartment having a body with a substantially hollow interior and having an access opening through said body thereof into said interior thereof; and
   (b) access/attachment means for attaching said body of said storage compartment to said body of said vehicle with said access opening through said body of said storage compartment substantially aligned with said access opening through said body of said vehicle for allowing access into said interior of said body of said storage compartment from said interior of said body of said vehicle; said access/attachment means including a first access/attachment member located within said interior of said body of said storage compartment, a second access/attachment member located within said interior of said body of said vehicle, and securing means for securing said first and second access/attachment members to one another in such a manner so as to substantially align said access opening through said body of said storage compartment with said access opening through said body of said vehicle; said first access/attachment member including a sleeve member for extending into said access opening through said body of said storage compartment, said second access/attachment member including a sleeve member for extending into said access opening through said body of said vehicle.

2. The pod of claim 1 in which said sleeve member of said first and second access/attachment members are adapted to overlap at least a portion of one another.

3. The pod of claim 2 in which said first access/attachment member includes a flange member attached to and extending outwardly of said sleeve member of said first access/attachment member for engaging said body of said storage compartment adjacent said access opening therethrough; and in which said second access/attachment member includes a flange member attached to and extending outwardly of said sleeve member of said second access/attachment member for engaging said body of said vehicle adjacent said access opening therethrough.

4. The pod of claim 3 in which said securing means includes a plurality of bolts for securing said flange member of said first access/attachment member and said flange member of said second access/attachment member to one another with portions of said body of said storage compartment and said body of said vehicle sandwiched therebetween.

5. The pod of claim 4 in which is included a first seal member for placement between said flange member of said first access/attachment member and said body of said vehicle, and in which is included a second seal member for placement between said flange member of said second access/attachment member and said body of said vehicle.

6. The pod of claim 5 in which said body of said vehicle includes at least one structural member and in which at least one of said bolts extends through said at least one structural member.

7. The pod of claim 3 in which said flange member of said first access/attachment member is positioned intermediate the opposite ends of said sleeve member of said first access/attachment member to divide said sleeve member into a first end and a second end for allowing said first end of said sleeve member of said first access/attachment member to extend into said access opening through said body of said storage compartment while allowing said second end of said sleeve member of said first access/attachment member to extend into said interior of said storage compartment for defining lip around said access opening through said body of said storage comparment.

8. The pod of claim 7 in which said first end of said sleeve member of said first access/attachment member is adapted to extend through said access opening through said body of said storage compartment and into said access opening through said body of said vehicle.

9. A storage pod for a recreational vehicle, said vehicle having a body with a roof and a substantially hollow interior and having an access opening through said roof into said interior, said pod comprising:
  (a) a storage compartment having a body with a substantially hollow interior and having an access opening through said body thereof into said interior thereof; and
  (b) access/attachment for attaching said body of said storage compartment to said roof of said vehicle with said access opening through said body of said storage compartment substantially aligned with said access opening through said roof of said vehicle for allowing access from said interior of said body of said vehicle into said interior of said body of said storage compartment; said access/attachment means including a first access/attachment member having a flange member, including a second access/attachment member having a flange member and including securing means for securing said first and second access/attachment members to one another with a portion of said body of said storage compartment and a portion of said roof of said vehicle sandwiched between said flange of said first access/attachment member and said flange of said second access/attachment member.

* * * * *